(12) United States Patent
Chen et al.

(10) Patent No.: US 12,173,484 B2
(45) Date of Patent: Dec. 24, 2024

(54) ATMOSPHERIC WATER HARVESTING DEVICE BASED ON A SEMICONDUCTOR CHILLING PLATE AND A PREPARATION METHOD THEREOF

(71) Applicant: Shanghai Maritime University, Shanghai (CN)

(72) Inventors: Zhenhui Chen, Shanghai (CN); Daolun Feng, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 174 days.

(21) Appl. No.: 18/120,390

(22) Filed: Mar. 11, 2023

(65) Prior Publication Data

US 2023/0399824 A1 Dec. 14, 2023

(30) Foreign Application Priority Data

Jun. 9, 2022 (CN) .......................... 202210653159.8

(51) Int. Cl.
*B01D 53/26* (2006.01)
*E03B 3/28* (2006.01)
*F25B 21/02* (2006.01)

(52) U.S. Cl.
CPC .............. *E03B 3/28* (2013.01); *B01D 53/261* (2013.01); *F25B 21/02* (2013.01);
(Continued)

(58) Field of Classification Search
CPC . E03B 3/28; E03B 7/078; E03B 7/095; E03B 11/00; B01D 53/261; B01D 53/04;
(Continued)

(56) References Cited

U.S. PATENT DOCUMENTS

2007/0261413 A1* 11/2007 Hatamian ............. F24F 5/0042
62/93
2008/0295695 A1* 12/2008 Takeuchi ............... A01G 25/02
96/108

(Continued)

FOREIGN PATENT DOCUMENTS

EP         3147642 A1 *  3/2017  ............... B01D 1/14
WO    WO-2013026126 A1 *  2/2013  ........... B01D 5/0015

OTHER PUBLICATIONS

Notice of Grant of Invention Patent, issued in CN App. No. 202210653159.8 (priority application), issued by China National Intellectual Property Office, on Jun. 13, 2024.

*Primary Examiner* — Frank M Lawrence, Jr.
(74) *Attorney, Agent, or Firm* — Zhu Lehnhoff LLP (57) ABSTRACT

The invention discloses an atmospheric water harvesting device based on a semiconductor chilling plate and a preparation method thereof. A first anti-gravity wicking material and a second anti-gravity wicking material are used as water transmission channel to realize a continuous atmospheric water harvesting on the same plane, the first anti-gravity wicking material and the second anti-gravity wicking material are combined with the semiconductor chilling plate, and the cold side can continuously maintain the temperature of the hygroscopic area, so that the hygroscopic salt on the surface of the anti-gravity wicking material maintains a stable moisture absorbing rate. The heat at the hot side can accurately heat the desorbing area on the surface of the material, the cooling capacity and the heat of the semiconductor chilling plate can be fully utilized, and the atmospheric water absorbing with low energy consumption is realized.

12 Claims, 3 Drawing Sheets

(52) U.S. Cl.
CPC .... *B01D 2253/112* (2013.01); *B01D 2257/80* (2013.01); *B01D 2259/40098* (2013.01); *F25B 2321/023* (2013.01)

(58) Field of Classification Search
CPC .......... B01D 2253/112; B01D 2257/80; B01D 2259/40098; F25B 21/02; F25B 2321/023; F25B 15/00; F25B 37/00; F25B 41/20; F25B 41/42; F25B 49/04; F25B 49/00; Y02A 20/00
USPC ........... 95/91, 107, 114, 115, 117, 121, 126; 96/108, 118, 121, 126
See application file for complete search history.

(56) References Cited

U.S. PATENT DOCUMENTS

| | | | |
|---|---|---|---|
| 2020/0298174 A1* | 9/2020 | Boudreault | B01D 53/261 |
| 2022/0316192 A1* | 10/2022 | Friesen | B01D 53/265 |
| 2023/0111690 A1* | 4/2023 | Stewart | E03B 3/28 |
| | | | 62/285 |
| 2023/0304270 A1* | 9/2023 | Friesen | B01D 53/0438 |

* cited by examiner

ATMOSPHERIC WATER HARVESTING DEVICE BASED ON A SEMICONDUCTOR CHILLING PLATE AND A PREPARATION METHOD THEREOF

REFERENCE TO RELATED APPLICATIONS

The present application claims the priority of Chinese patent application No. 202210653159.8, filed Jun. 9, 2022, the entire disclosure of which is incorporated herein by reference.

TECHNICAL FIELD

The invention relates to the technical field of water harvesting devices, in particular to an atmospheric water harvesting device based on a semiconductor chilling plate and a preparation method thereof.

BACKGROUND

Water resources are one of the important resources for human life. Although the water resources on the earth are abundant, freshwater resource is very scarce, and only 0.36 percent of water resource can be really potable. About 500 million people suffer from extreme fresh water shortages throughout the year, so that searching for a solution for solving the shortage of fresh water becomes one of the problems to be solved urgently at present; however, it was found that the atmosphere contains more than $12.9 \times 10^{12}$ m$^3$ of regenerable water.

At present, the domestic and foreign atmospheric water extraction technology mainly includes three types of surface cooling, membrane separation and adsorption/absorption condensation method. The surface cooling technology is characterized in that absorbed humid air is rapidly lowered to be below a dew point through additional energy input, the water extraction of the equipment is not affected by objective factors such as weather and climatic conditions, and the application range is wide. However, the energy consumption of surface cooling equipment is large, and the equipment is bulky and expensive. At present, the surface cooling technology is mainly used in the environment with high humidity or domestic water supply, farmland irrigation, emergency water and the like. The membrane separation technology has high water harvesting efficiency, simple mechanical structure and lower maintenance cost. However, this technique has a relatively serious membrane fouling phenomenon. The method is mainly used in areas with high environmental humidity. The adsorption/absorption condensation method refers to a method of utilizing adsorbent to absorb moisture in humid air, heating the adsorbent, evaporating the absorbed moisture, and finally obtaining liquid water by condensation. Compared with an electrically driven water harvesting method, the method has the advantages of simple device, low cost, environmental protection and high water yield, and can be used in low-humidity environment with insufficient water resources, such as arid areas like deserts and the like. Many adsorption type atmospheric water harvesting devices are designed by using the method, but most devices absorb moisture at night, desorbing mainly by sunlight in the daytime, cannot realize all-day continuous moisture absorption, therefore, the moisture absorption capacity of the device is still not ideal in recent years. Researchers realize continuous atmospheric water harvesting by adopting an interactive mode, namely, a plurality of adsorption beds are adopted to absorb and desorb moisture alternately, so that the moisture absorption capacity of the whole device is improved. However, the original cost is increased by the provision of a plurality of adsorption beds, and the problem of continuous atmospheric water absorbing in all weather is not solved essentially.

SUMMARY

In order to solve or partially solve the problems in the related art, the invention provides an atmospheric water harvesting device based on a semiconductor chilling plate and a preparation method thereof, wherein a hygroscopic area and a desorbing area are respectively formed on a water absorption system through cold sides and hot sides of the semiconductor chilling plates, so that water can be taken in the air with low energy consumption. According to the invention, the continuous water absorbing in the air by regularly switching the cold sides and the hot sides of the semiconductor chilling plates is also realized.

The invention discloses an atmospheric water harvesting device based on a semiconductor chilling plate, the device comprises:
 a water absorbing system;
 a semiconductor refrigeration system comprising at least two semiconductor chilling plates; and
 a temperature control system for controlling the temperature of cold sides and/or hot sides of the semiconductor chilling plates;
 wherein, the cold sides of the semiconductor chilling plates are used for reducing or maintaining the temperature of a part of the water absorbing system, the hot sides of the semiconductor chilling plates are used for increasing or maintaining the temperature of other part of the water absorbing system, and the cold sides and the hot sides of the semiconductor chilling plate can be switched to realize circulating continuous atmospheric water harvesting.

Optionally, the water absorbing system comprises a first anti-gravity wicking material and a second anti-gravity wicking material. The semiconductor chilling plates are located between the first anti-gravity wicking material and the second anti-gravity wicking material.

Optionally, there are two semiconductor chilling plates which are a first semiconductor chilling plate and a second semiconductor chilling plate.

Optionally, the cold side and the hot side of the first semiconductor chilling plate are respectively adhered to the first anti-gravity wicking material and the second anti-gravity wicking material, forming a hygroscopic area and a desorbing area on the first anti-gravity wicking material and the second anti-gravity wicking material, respectively. The hot side and the cold side of the second semiconductor chilling plate are respectively adhered to the first anti-gravity wicking material and the second anti-gravity wicking material, forming another desorbing area and another hygroscopic area on the first anti-gravity wicking material and the second anti-gravity wicking material respectively; the current direction of the first semiconductor chilling plate and the second semiconductor chilling plate are periodically changed, so that the initial cold side is changed into the hot side, the initial hot side is changed into the cold side, correspondingly, the initial hygroscopic area is changed into the desorbing area, and the initial desorbing area is changed into the hygroscopic area, thereby the all-day continuous atmospheric water harvesting with low energy consumption is realized.

Optionally, the hygroscopic area and the desorbing area are respectively provided with a condensing cover, and wherein the condensing cover is connected with a water storage tank through a condensing water pipeline.

Optionally, the device further comprises: an air inlet assembly for delivering the humid air to the condensing cover.

Optionally, the air inlet assembly comprises:
a pump;
a first three-way valve, wherein the air inlet end of the first three-way valve is communicated with the air outlet end of the pump body through a first air inlet pipeline, and the air outlet end of the first three-way valve is communicated with the two condensing covers through a second air outlet pipeline; and
a second three-way valve, wherein the air inlet end of the second three-way valve is communicated with the air outlet end of the pump body through the first air inlet pipeline, and the air outlet end of the second three-way valve is communicated with the other two condensing covers through the second air outlet pipeline.

Optionally, the hygroscopic area of the first anti-gravity wicking material and/or the hygroscopic area of the second anti-gravity wicking material is coated with hygroscopic salt.

Optionally, a heat insulating material is arranged between the two semiconductor chilling plates.

On the other hand, the invention also discloses a water extraction method, which adopts the atmospheric water harvesting device to take water. The method comprises the steps of:

step 1, coating hygroscopic salt on the half area of the surface of the anti-gravity wicking materials, then closely attaching the anti-gravity wicking material coated with the hygroscopic salt to front and back surfaces of a group of semiconductor chilling plates based on Peltier effect, wherein the area where the anti-gravity wicking material is attached to the cold side of the semiconductor is a hygroscopic area, and the area where the anti-gravity wicking material is attached to the hot side of the semiconductor is a desorbing area;

step 2, controlling the direction of the first three-way valve and the second three-way valve, introducing humid air into the hygroscopic area, enabling the hygroscopic salt on the surface of the anti-gravity wicking material to absorb moisture, and converting the hygroscopic salt into a salt solution; the salt solution is transported to the desorbing area from the hygroscopic area by means of the property of the material surface for anti-gravity absorbing water, using the heat of the hot sides of the semiconductor chilling plates to evaporate the water in the salt solution, fresh water is obtained after condensing;

step 3, the hygroscopic salt is gradually accumulated in the desorbing area, and most of the hygroscopic salt in the hygroscopic area is transferred to the desorbing area; at the moment, changing the current direction of the semiconductor chilling plates, the cold and hot sides of the semiconductor is changed, the moisture absorption and desorbing area of the original material surface are also changed; at the moment, the hygroscopic salt in the hygroscopic area again starts a new cycle of hygroscopic work;

step 4, circulating the step 2 to the step 3, realizing low energy consumption all-day continuous adsorption type atmospheric water harvesting device.

Optionally, the method further comprises: the current direction of the semiconductor chilling plates is changed periodically to switch the cold sides and the hot sides of the semiconductor chilling plates, thereby realizing the circulating water extraction.

The technical solution provided by the invention has the following beneficial effects:

The present invention utilizes the first anti-gravity wicking material and the second anti-gravity wicking material as water transmission channel, realizing continuous atmospheric water absorbing on the same plane. In addition, the first anti-gravity wicking material and the second anti-gravity wicking material are combined with the semiconductor chilling plates, and the cold sides can maintain the temperature of the hygroscopic area continuously, so that the hygroscopic salt on the surface of the anti-gravity wicking material maintains a fixed moisture absorbing rate. The heat at the hot side can accurately heat the desorbing area on the surface of the material, and the cooling capacity and heat of the semiconductor chilling plates can be fully utilized to realize the atmospheric water harvesting with low energy consumption. The method can realize all-day continuous atmospheric water harvesting, the cold sides and the hot sides of the semiconductor chilling plates are switched by regularly switching the current direction of the semiconductor chilling plates, so that the moisture absorption and desorbing area of the anti-gravity wicking material is converted, and the overall water intake amount is greatly improved. The method is suitable for various environments, and has the advantages of wide application range, small occupied area and low energy consumption.

It is to be understood that the foregoing general description and the following detailed description are merely exemplary and illustrative and are not intended to limit the invention.

Compared with the prior art, the present disclosure has the advantages of:

1. The invention applies the anti-gravity wicking material to the continuous atmospheric water harvesting device, and realizes the directional transportation of water by means of the special performance of the anti-gravity wicking material;
2. According to the invention, a hygroscopic area and a desorbing area are formed on the water absorption system through the cold side and the hot side of the semiconductor chilling plate to realize the water absorbing with low energy consumption in the atmosphere;
3. According to the invention, the cold side and the hot side of the semiconductor chilling plate are switched regularly in a mode of changing the current direction of the semiconductor cooling sheets regularly, so that water is continuously taken from the atmosphere;
4. The semiconductor refrigeration system of the present invention enables water absorbing planes form on the first anti-gravity wicking material and the second anti-gravity wicking material, so that the water intake efficiency is higher, and the water harvesting amount of the whole device is higher.

DESCRIPTION OF THE DRAWINGS

In order to more clearly illustrate the technical solution of the embodiments of the invention, the drawings used in the description of the embodiments, will be briefly described below. It will be apparent that the drawings in the following description are merely examples of the present invention and that other drawings may be obtained according to these drawings without inventive effort by those of ordinary skill in the art.

DETAILED DESCRIPTION OF THE EMBODIMENT

Embodiments of the invention will now be described in more detail with reference to the accompanying drawings, although embodiments of the invention are shown in the drawings, it should be understood that the present invention may be embodied in various forms and should not be limited by the embodiments set forth herein. Rather, these embodiments are provided to make the present invention more thorough and complete and to convey the scope of the present invention in its entirety to those skilled in the art.

The embodiments of the invention provide an atmospheric water harvesting device based on a semiconductor chilling plate, which is used for efficiently preparing drinking water in low-humidity environment, water resource shortage, polluted water bodies and remote areas. The water harvesting device in the embodiments fully utilizes the cooling capacity and heat generated by the semiconductor chilling plates to realize the low-energy-consumption all-day continuous atmospheric water harvesting.

Figure 1:
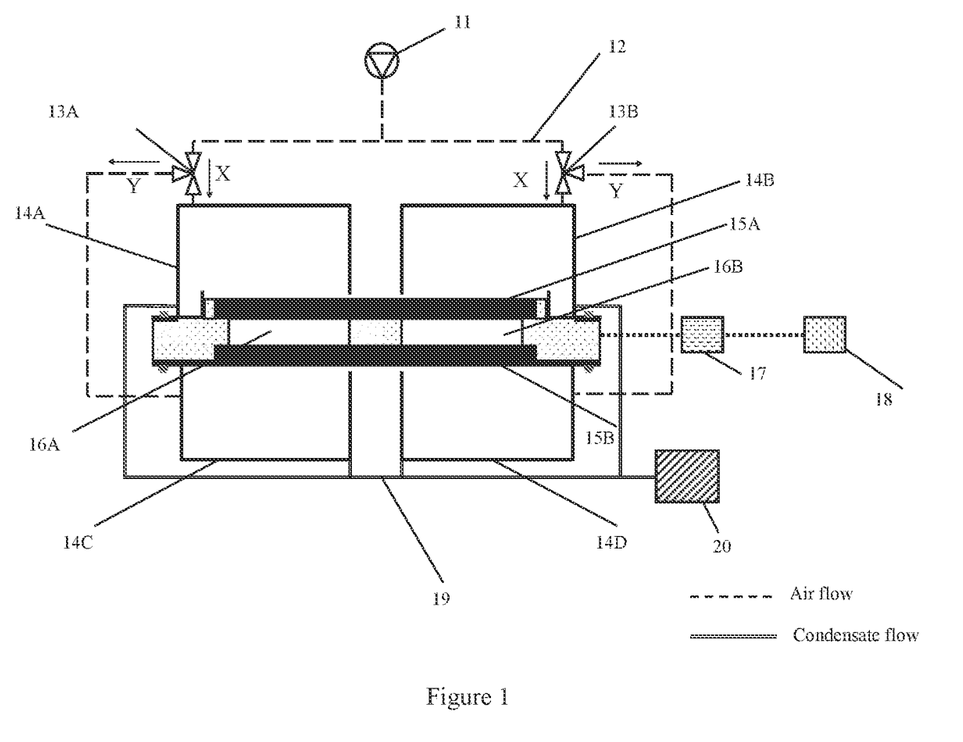
FIG. 1 is a schematic diagram of a water harvesting device according to an embodiment of the present invention.
Figure 2:
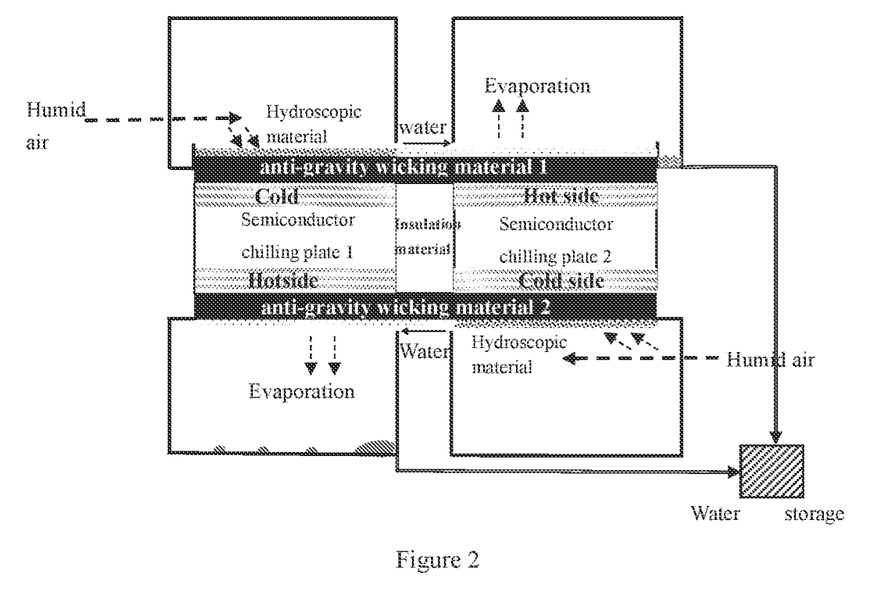
FIG. 2 is a schematic diagram of a water harvesting device according to an embodiment of the present invention.

Referring to FIGS. 1 and 2, the water harvesting device of the embodiment generally comprises: a water absorbing system and a semiconductor refrigeration system. The semiconductor refrigeration system comprises at least two semiconductor chilling plates, the semiconductor chilling plate is relatively thin and is generally about 3.7 mm. The water absorbing system generally includes a first anti-gravity wicking material 15A and a second anti-gravity wicking material 15B with anti-gravity wicking properties; wherein a half area of the surface of the first anti-gravity wicking material and a half area of the surface of the second anti-gravity wicking material are coated with hygroscopic salts, and the first anti-gravity wicking material 15A and the second anti-gravity wicking material 15B are used as water transport channels capable of transporting a hygroscopic salt solution on the surface of the material from the hygroscopic area to the desorbing area at the other end. The semiconductor chilling plates are positioned between the first anti-gravity wicking material 15A and the second anti-gravity wicking material 15B. In the water harvesting device of the embodiment, the anti-gravity wicking materials (15A and 15B) are in contact with a plurality of hot sides and a plurality of cold sides to realize continuous adsorption type atmospheric water harvesting on the same plane (i.e., the plane where the first anti-gravity wicking material 15A and the second anti-gravity wicking material 15B are positioned).

Figure 4:
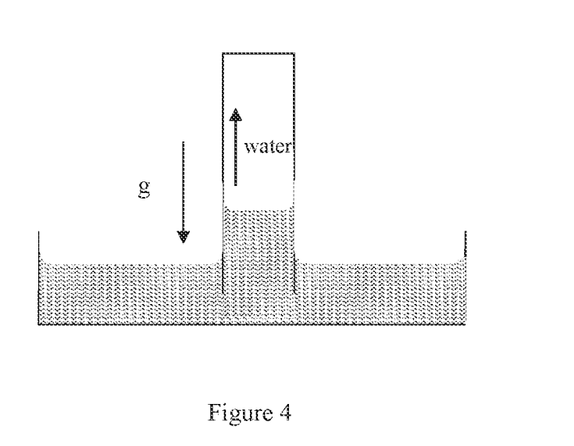
FIG. 4 is a schematic diagram of the capillary action of the first anti-gravity wicking material/the second anti-gravity wicking material according to an embodiment of the present invention.
Figure 5:
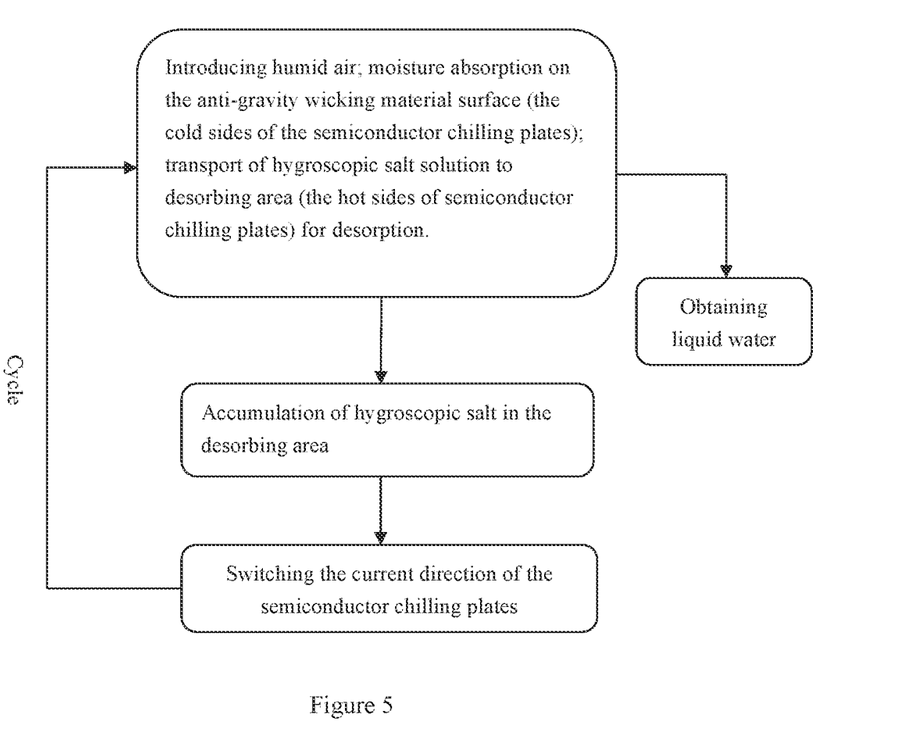
FIG. 5 is a flow chart of the water harvesting method according to an embodiment of the present invention

Referring to FIG. 4, the surfaces of the first anti-gravity wicking material 15A and the second anti-gravity wicking material 15B which are have capillary structures, based on the capillary action of the capillary structures, liquid on the surfaces of the first anti-gravity wicking material 15A and the second anti-gravity wicking material 15B is automatically transported from one end to the other end, i.e., anti-gravity wicking. The hygroscopic salt is bonded to the surfaces of the first anti-gravity wicking material 15A and the second anti-gravity wicking material 15B, and after the hygroscopic salt absorbs moisture, the salt solution is automatically transported from the hygroscopic area to the desorbing area by the anti-gravity wicking of the material. The water in the salt solution is evaporated by utilizing the heat of the hot sides of the semiconductor chilling plates and condensed to obtain liquid water. Regularly changing the current direction of the semiconductor chilling plates to solve the problem that the hygroscopic salt is enriched in the desorbing area and cannot continuously absorb moisture. The initial cold sides of the semiconductor chilling plates are converted into hot sides and the moisture absorption and desorbing areas on the surface of the material are also switched. At this time, the directions of the first and second three-way valves are adjusted to introduce humid air into the new cycle of the hygroscopic area, and the hygroscopic salt begins to absorb moisture in the next cycle. The low-energy-consumption all-day continuous atmospheric water harvesting is realized by utilizing the anti-gravity water absorbing of the first anti-gravity wicking material 15A and the second anti-gravity wicking material 15B and assisting in changing the current direction of the semiconductor chilling plates regularly.

In the embodiment, the number of the semiconductor chilling plates is two, namely the first semiconductor chilling plate 16A and the second semiconductor chilling plate 16B, and the two semiconductor chilling plates can better divide a hygroscopic area and andesorption area, so that high-efficiency continuous atmospheric water harvesting is realized.

It should be noted that the number of semiconductor chilling plates may be three or more, and the present embodiment is only exemplarily illustrated that the number of the semiconductor chilling plates is two.

The semiconductor chilling plate generates the Peltier effect when direct current passes through the thermoelectric semiconductor material (the Peltier effect means that when the direct current passes through a loop formed by two different conductive materials, in addition to irreversible Joule heat, the endothermic and exothermic phenomena can be generated at the couple nodes due to different directions of the introduced direct current; and the effect is reversible, if the current direction is changed, the endothermic phenomena can be converted into exothermic phenomena), so that the two ends respectively absorb heat and release heat to realize refrigeration.

Figure 3:
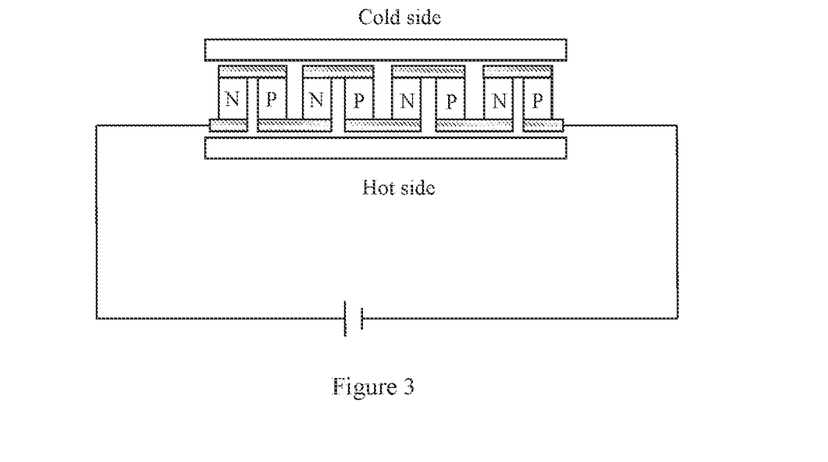
FIG. 3 is a schematic diagram of the semiconductor chilling plates according to an embodiment of the present invention.

Referring to FIG. 3, the semiconductor chilling plate includes N-type semiconductor material and P-type semiconductor material, the N-type semiconductor material and the P-type semiconductor material form a pair of thermocouples. When the current flows from the P-type semiconductor to the N-type semiconductor, free electrons in the N-type semiconductor conduction band enter the P-type semiconductor conduction band through the contact surface, and the free electrons entering the P-type semiconductor conduction band immediately recombine with holes in the full band, energy generated by the recombination is converted into heat and is discharged from the joint. At this time, holes in the full band of the P-type semiconductor can enter the full band of the N-type semiconductor through the contact surface, the holes entering the full band of the N-type semiconductor can immediately recombine with free electrons in the conduction band, energy generated by recombination can be converted into heat to be discharged from the joint, so that the temperature at the joint is increased to become a hot side, and the heat is continuously discharged to the outside. When the current flows from the N-type semiconductor to the P-type semiconductor, electrons in the full band of the P-type semiconductor jump into the conduction band to become free electrons, and holes are reserved in the full band, so that electron/hole pairs are generated, which requires energy absorption; and the N-type semiconductor can also generate electron/hole pairs, which requires energy absorption, so that the temperature at the joint is reduced, and a cold side is formed.

Based on the principle, the cold side and the hot side of the semiconductor chilling plate are utilized to divide the surface of the material into a hygroscopic area and a desorbing area, hygroscopic salt in the hygroscopic area of the cold side can efficiently absorb moisture in the air, and meanwhile, energy of the cold side and the hot side of the semiconductor is transmitted to the surface of the material combined with the chilling plates in a heat conduction mode for evaporating water.

In this embodiment, the cold side and the hot side of the first semiconductor chilling plate 16A are respectively attached to the first anti-gravity wicking material 15A and the second anti-gravity wicking material 15B to form a hygroscopic area and a desorbing area on the first anti-gravity wicking material 15A and the second anti-gravity wicking material 15B, respectively. The hot side and the cold side of the second semiconductor chilling plate 16B are respectively attached to the first anti-gravity wicking material 15A and the second anti-gravity wicking material 15B to form another desorbing area and another hygroscopic area on the first anti-gravity wicking material 15A and the second anti-gravity wicking material 15B respectively.

In this embodiment, condensing covers (14A, 14B, 14C, and 14D) are provided on the hygroscopic area and the desorbing area, respectively; The bottom ends of the condensing covers (14A, 14B, 14C and 14D) are connected with a water storage tank 20 through a condensed water pipeline 19.

In this embodiment, the water harvesting device further includes an air inlet assembly for delivering humid air to the condensing covers (14A, 14B, 14C, and 14D).

Specifically, the intake assembly generally comprises: a pump 11, a first three-way valve 13A and a second three-way valve 13B. The air inlet end of the first three-way valve 13A is communicated with the air outlet end of the pump 11 through a first air inlet pipeline 12, and the air outlet end of the first three-way valve 13A is communicated with the two condensing covers (14A and 14C) through a second air outlet pipeline; the air inlet end of the second three-way valve 13B is communicated with the air outlet end of the pump 11 through the first air inlet pipeline 12, and the air outlet end of the second three-way valve 13B is communicated with the other two condensing covers (14B and 14D) through the second air outlet pipeline.

Preferably, the pump 11 is a vacuum pump.

In the embodiment, the hygroscopic area of the first anti-gravity wicking material 15A and the hygroscopic area of the second anti-gravity wicking material 15B are respectively coated with hygroscopic salts, and the hygroscopic salts can efficiently absorb moisture in humid air, so that the water harvesting efficiency of the water harvesting device is improved.

In another embodiment, in addition to being coated with hygroscopic salts on the hygroscopic areas of the first and second anti-gravity wicking materials, respectively, hygroscopic salts are coated on the moisture desorbing areas of the first and second anti-gravity wicking materials, respectively.

Preferably, the hygroscopic salt is $LiCl$ or $CaCl_2$) or other hygroscopic material having the same properties.

When water is taken, the flow direction of the first three-way valve 13A is adjusted to the X direction, the flow direction of the second three-way valve 13B is adjusted to the Y direction, so that humid air respectively enters the corresponding hygroscopic areas, and the hygroscopic areas on the surfaces of the first anti-gravity wicking material 15A and the second anti-gravity wicking material 15B contact with the humid air to start moisture absorption; subsequently, the first anti-gravity wicking material 15A and the second anti-gravity wicking material 15B convey the hygroscopic salt solution to the desorbing area, the heat of the hot sides of the first semiconductor chilling plate 16A and the second semiconductor chilling plate 16B is transferred to the desorbing area, the water of the salt solution is evaporated to form vapor after absorbing the heat, then liquid water is obtained by condensation, and finally the liquid water is collected to the water storage tank 20.

In the embodiment, the heat insulation material is arranged between the two semiconductor chilling plates, so that the mutual influence of the temperature of the cold side and the hot side can be avoided, and the stable moisture absorption rate and the stable hot side desorption rate of the hygroscopic material are maintained, and the water harvesting continuity and the high efficiency of the whole continuous atmospheric water harvesting device are finally realized.

In the embodiment, the water harvesting device also comprises a temperature control system 17, wherein the temperature control system 17 is used for controlling the temperature of the cold sides and the hot sides of the semiconductor chilling plates (16A and 16B); and a power supply 18 is arranged on the temperature control system 17.

The foregoing description is merely illustrative of embodiments of the invention and is not intended to limit the scope of the invention. Any modifications, equivalents, substitutions, and modifications made within the spirit and scope of the invention are intended to be included within the scope of the invention.

The invention claimed is:

1. An atmospheric water harvesting device based on a semiconductor chilling plate, wherein the device comprises:
    a water absorbing system comprising a first anti-gravity wicking material and a second anti-gravity wicking material, wherein semiconductor chilling plates are located between the first anti-gravity wicking material and the second anti-gravity wicking material;
    a semiconductor refrigeration system comprising a first semiconductor chilling plate and a second semiconductor chilling plate, wherein cold sides and hot sides of the first semiconductor chilling plate are respectively adhered to the first anti-gravity wicking material and the second anti-gravity wicking material, forming a hygroscopic area and a desorbing area on the first anti-gravity wicking material and the second anti-gravity wicking material, respectively; wherein the hot side and the cold side of the second semiconductor chilling plate are respectively jointed with the first anti-gravity wicking material and the second anti-gravity wicking material, forming another desorbing area and another hygroscopic area on the first anti-gravity wicking material and the second anti-gravity wicking material respectively; a current direction of the first semiconductor chilling plate and the second semiconductor chilling plate are periodically changed, so that an initial cold side is changed into the hot side, an initial hot side is changed into the cold side, correspondingly, an initial hygroscopic area is changed into the desorbing area, and an initial desorbing area is changed into the hygroscopic area; wherein the hygroscopic area of the first anti-gravity wicking material and/or the hygroscopic area of the second anti-gravity wicking material is coated with hygroscopic salt, and wherein a heat insulating material is arranged between the two semiconductor chilling plates; and a temperature control system for controlling the temperature of cold sides and/or hot sides of the semiconductor chilling plates;

wherein the cold sides of the semiconductor chilling plates are used for reducing or maintaining the temperature of a part of the water absorbing system, the hot sides of the semiconductor chilling plates are used for increasing or maintaining the temperature of another part of the water absorbing system, and the cold sides and the hot sides of the semiconductor chilling plates can be switched to realize circulating continuous atmospheric water harvesting.

2. The atmospheric water harvesting device based on a semiconductor chilling plate according to claim 1, wherein the hygroscopic area and the desorbing area are respectively provided with a condensing cover, and wherein the condensing cover is connected with a water storage tank through a condensing water pipeline.

3. The atmospheric water harvesting device based on a semiconductor chilling plate according to claim 2, further comprises an air inlet assembly for delivering the humid air to the condensing cover.

4. The atmospheric water harvesting device based on a semiconductor chilling plate according to claim 3, wherein the air inlet assembly comprises:
   a pump;
   a first three-way valve, wherein an air inlet end of the first three-way valve is communicated with an air outlet end of the pump through a first air inlet pipeline, and the air outlet end of the first three-way valve is communicated with two condensing covers through a second air outlet pipeline; and
   a second three-way valve, wherein an air inlet end of the second three-way valve is communicated with the air outlet end of the pump through the first air inlet pipeline, and the air outlet end of the second three-way valve is communicated with the two other condensing covers through the second air outlet pipeline.

5. A preparation method of atmospheric water harvesting device based on a semiconductor chilling plate according to claim 4, comprising the following steps:
   step 1, coating hygroscopic salt on a half of the surface of the anti-gravity wicking material, then closely attaching the anti-gravity wicking material coated with the hygroscopic salt to front and back surfaces of a group of the semiconductor chilling plates based on Peltier effect, wherein the area where the anti-gravity wicking material is attached to the cold side of the semiconductor is a hygroscopic area, and the area where the anti-gravity wicking material is attached to the hot side of the semiconductor is a desorbing area;
   step 2, controlling a direction of the first three-way valve and the second three-way valve, introducing humid air into the hygroscopic area, enabling the hygroscopic salt on the surface of the anti-gravity wicking material to absorb moisture, and converting the hygroscopic salt into a salt solution; the salt solution is transported to the desorbing area from the hygroscopic area by means of the property of the material surface for anti-gravity absorbing water, using the heat of the hot sides of the semiconductor chilling plates to evaporate the water in the salt solution, fresh water is obtained after condensing;
   step 3, the hygroscopic salt is gradually accumulated in the desorbing area, and most of the hygroscopic salt in the hygroscopic area is transferred to the desorbing area; at the moment, changing the current direction of the semiconductor chilling plates, the cold and hot sides of the semiconductor is changed, the moisture absorption and desorbing area of the original material surface are also changed; at the moment, the hygroscopic salt in the hygroscopic area again starts a new cycle of hygroscopic work;
   step 4, circulating the step 2 to the step 3, realizing low energy consumption all-day continuous adsorption type atmospheric water.

6. The preparation method according to claim 5, wherein in the step 3, the current direction of the semiconductor chilling plates is changed periodically to switch the cold sides and the hot sides of the semiconductor chilling plates, thereby realizing the circulating water extraction.

7. A preparation method of atmospheric water harvesting device based on a semiconductor chilling plate according to claim 3, comprising the following steps:
   step 1, coating hygroscopic salt on the half area of the surface of the anti-gravity wicking material, then closely attaching the anti-gravity wicking material coated with the hygroscopic salt to front and back surfaces of a group of the semiconductor chilling plates based on Peltier effect, wherein the area where the anti-gravity wicking material is attached to the cold side of the semiconductor is a hygroscopic area, and the area where the anti-gravity wicking material is attached to the hot side of the semiconductor is a desorbing area;
   step 2, controlling a direction of the first three-way valve and the second three-way valve, introducing humid air into the hygroscopic area, enabling the hygroscopic salt on the surface of the anti-gravity wicking material to absorb moisture, and converting the hygroscopic salt into a salt solution; the salt solution is transported to the desorbing area from the hygroscopic area by means of the property of the material surface for anti-gravity absorbing water, using the heat of the hot sides of the semiconductor chilling plates to evaporate the water in the salt solution, fresh water is obtained after condensing;
   step 3, the hygroscopic salt is gradually accumulated in the desorbing area, and most of the hygroscopic salt in the hygroscopic area is transferred to the desorbing area; at the moment, changing the current direction of the semiconductor chilling plates, the cold and hot sides of the semiconductor is changed, the moisture absorption and desorbing area of the original material surface are also changed; at the moment, the hygroscopic salt in the hygroscopic area again starts a new cycle of hygroscopic work;
   step 4, circulating the step 2 to the step 3, realizing low energy consumption all-day continuous adsorption type atmospheric water.

8. The preparation method according to claim 7, wherein in the step 3, the current direction of the semiconductor chilling plates is changed periodically to switch the cold sides and the hot sides of the semiconductor chilling plates, thereby realizing the circulating water extraction.

9. A preparation method of atmospheric water harvesting device based on a semiconductor chilling plate according to claim 2, comprising the following steps:

step 1, coating hygroscopic salt on the half area of the surface of the anti-gravity wicking material, then closely attaching the anti-gravity wicking material coated with the hygroscopic salt to front and back surfaces of a group of the semiconductor chilling plates based on Peltier effect, wherein the area where the anti-gravity wicking material is attached to the cold side of the semiconductor is a hygroscopic area, and the area where the anti-gravity wicking material is attached to the hot side of the semiconductor is a desorbing area;

step 2, controlling a direction of the first three-way valve and the second three-way valve, introducing humid air into the hygroscopic area, enabling the hygroscopic salt on the surface of the anti-gravity wicking material to absorb moisture, and converting the hygroscopic salt into a salt solution; the salt solution is transported to the desorbing area from the hygroscopic area by means of the property of the material surface for anti-gravity absorbing water, using the heat of the hot sides of the semiconductor chilling plates to evaporate the water in the salt solution, fresh water is obtained after condensing;

step 3, the hygroscopic salt is gradually accumulated in the desorbing area, and most of the hygroscopic salt in the hygroscopic area is transferred to the desorbing area; at the moment, changing the current direction of the semiconductor chilling plates, the cold and hot sides of the semiconductor is changed, the moisture absorption and desorbing area of the original material surface are also changed; at the moment, the hygroscopic salt in the hygroscopic area again starts a new cycle of hygroscopic work;

step 4, circulating the step 2 to the step 3, realizing low energy consumption all-day continuous adsorption type atmospheric water.

10. The preparation method according to claim 9, wherein in the step 3, the current direction of the semiconductor chilling plates is changed periodically to switch the cold sides and the hot sides of the semiconductor chilling plates, thereby realizing the circulating water extraction.

11. A preparation method of atmospheric water harvesting device based on a semiconductor chilling plate according to claim 1, comprising the following steps:

step 1, coating hygroscopic salt on the half area of the surface of the anti-gravity wicking material, then closely attaching the anti-gravity wicking material coated with the hygroscopic salt to front and back surfaces of a group of the semiconductor chilling plates based on Peltier effect, wherein the area where the anti-gravity wicking material is attached to the cold side of the semiconductor is a hygroscopic area, and the area where the anti-gravity wicking material is attached to the hot side of the semiconductor is a desorbing area;

step 2, controlling a direction of the first three-way valve and the second three-way valve, introducing humid air into the hygroscopic area, enabling the hygroscopic salt on the surface of the anti-gravity wicking material to absorb moisture, and converting the hygroscopic salt into a salt solution; the salt solution is transported to the desorbing area from the hygroscopic area by means of the property of the material surface for anti-gravity absorbing water, using the heat of the hot sides of the semiconductor chilling plates to evaporate the water in the salt solution, fresh water is obtained after condensing;

step 3, the hygroscopic salt is gradually accumulated in the desorbing area, and most of the hygroscopic salt in the hygroscopic area is transferred to the desorbing area; at the moment, changing the current direction of the semiconductor chilling plates, the cold and hot sides of the semiconductor is changed, the moisture absorption and desorbing area of the original material surface are also changed; at the moment, the hygroscopic salt in the hygroscopic area again starts a new cycle of hygroscopic work;

step 4, circulating the step 2 to the step 3, realizing low energy consumption all-day continuous adsorption type atmospheric water.

12. The preparation method according to claim 11, wherein in the step 3, the current direction of the semiconductor chilling plates is changed periodically to switch the cold sides and the hot sides of the semiconductor chilling plates, thereby realizing the circulating water extraction.

* * * * *